United States Patent
Ricci et al.

(10) Patent No.: US 7,074,868 B2
(45) Date of Patent: Jul. 11, 2006

(54) RANDOM BUTADIENE-ISOPRENE COPOLYMERS WITH A TRANS-1, 4 STRUCTURE

(75) Inventors: Giovanni Ricci, Parma (IT); Francesco Masi, Sant' Angelo Lodigiano-Lodi (IT); Marco Battistella, Novate Milanese (IT); Anna Sommazzi, Santa Margherita Ligure-Genova (IT); Roberto Santi, deceased, late of Novara (IT); by Maria Rivellini, legal representative, Novara (IT); by Sefano Santi, legal representative, Novara (IT); by Laura Santi, legal representative, Novara (IT)

(73) Assignees: ENI S.p.A., Rome (IT); Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 10/488,260

(22) PCT Filed: Aug. 27, 2002

(86) PCT No.: PCT/EP02/09672

§ 371 (c)(1), (2), (4) Date: Nov. 23, 2004

(87) PCT Pub. No.: WO03/022919

PCT Pub. Date: Mar. 20, 2003

(65) Prior Publication Data

US 2005/0222348 A1 Oct. 6, 2005

(30) Foreign Application Priority Data

Sep. 12, 2001 (IT) .......................... MI2001A1901

(51) Int. Cl.
*C08F 236/08* (2006.01)

(52) U.S. Cl. .................................. 526/337; 526/169.2

(58) Field of Classification Search ................ 526/337, 526/169.2
See application file for complete search history.

(56) References Cited

U.S. PATENT DOCUMENTS

| 3,892,722 | A | * | 7/1975 | Babitsky et al. ............... 526/92 |
| 5,405,927 | A | * | 4/1995 | Hsu et al. .................... 526/337 |
| 5,502,126 | A | * | 3/1996 | Bell et al. .................... 526/142 |
| 5,844,044 | A |   | 12/1998 | Sandstrom et al. |

FOREIGN PATENT DOCUMENTS

GB 968 899 9/1964

OTHER PUBLICATIONS

Giovanni Ricci, et al., "Polymerization of 1,3-dienes with methylaluminoxane-triacetylacetonatovanadium", Macromolecular Chemistry and Physics, vol. 195, No. 4, pp. 1389-1397 Apr. 1, 1994.

* cited by examiner

*Primary Examiner*—Fred Teskin
(74) *Attorney, Agent, or Firm*—Oblon, Spivak, McClelland, Maier & Neustadt, P.C.

(57) ABSTRACT

A description follows of random butadiene-isoprene copolymers with a trans-1,4 structure, having a butadiene/isoprene molar composition ranging from 98/2 to 32/68, the above copolymers being crystalline or amorphous depending on the isoprene content. The process for the preparation of the above copolymers is also described, in the present of a catalytic system which comprises: (a) a first component consisting of a vanadium compound selected from: (a1) compounds having general formula (Ia) $VO(L)_n(X)_m$ wherein n is an integer from 1 to 3 and m ranges from zero to 2, n+m being equal to 2 or 3; (a2) compounds having general formula (Ib) $V(L)_p(X)_q$ wherein p is an integer from 1 to 4, q ranges from zero to 3, the sum of p+q being equal to 3 or 4; wherein L is a bidentate ligand and X is a halogen, preferably Chlorine; (b) a second component selected from aluminoxanes and relative derivatives.

18 Claims, 2 Drawing Sheets

FIG. 1a
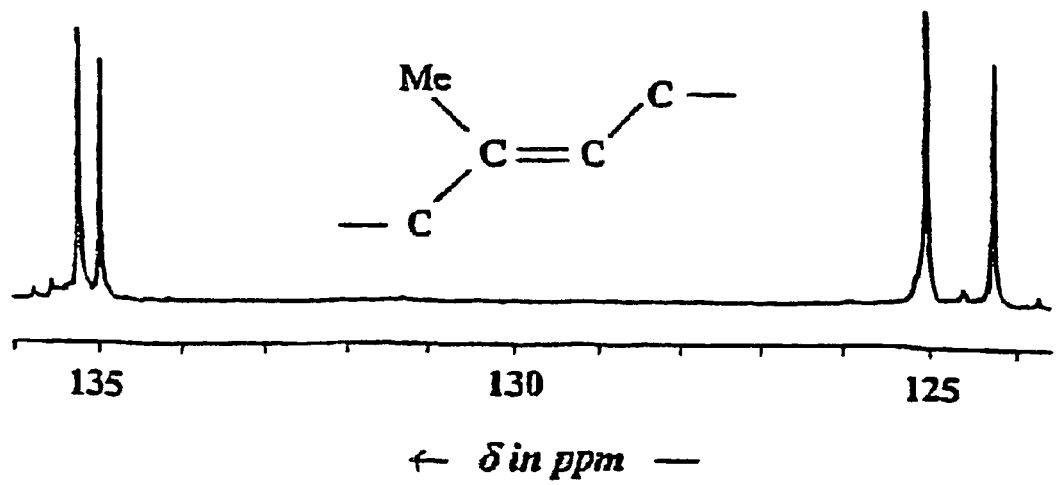
← δ in ppm —
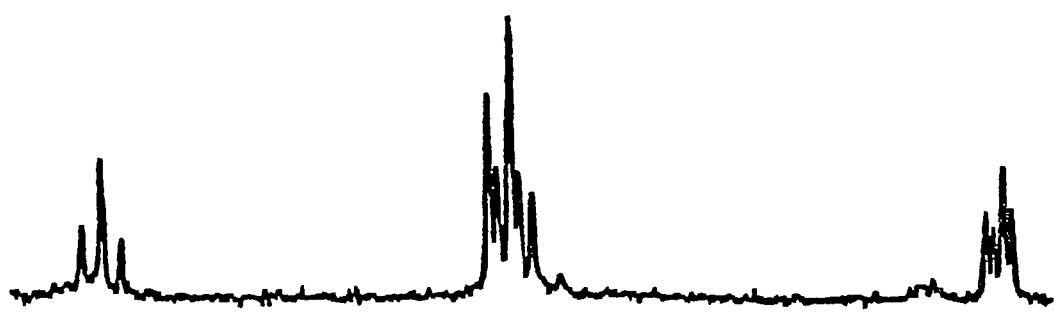
FIG. 1b

RANDOM BUTADIENE-ISOPRENE COPOLYMERS WITH A TRANS-1, 4 STRUCTURE

BACKGROUND OF THE INVENTION

1. Field of the Invention

The present invention relates to random butadiene-isoprene copolymers with a trans-1,4 structure and the process for their preparation.

2. Description of the Invention 1,4-trans polybutadiene can be prepared either by using catalysts based on transition metals or with catalytic systems based on metals of group I and II. The transition metals include titanium, vanadium, chromium, rhodium, iridium, cobalt and nickel.

The 1,4-trans polybutadiene obtained with catalysis based on transition metals is a material with resin characteristics having two melting points of 50° C. and 150° C.

Catalysts based on vanadium are by far the most important for the preparation of high molecular weight polybutadiene with a high 1,4-trans content. The $AlEt_3/VCl_3$ system gives rise to the formation of polymers whose content of 1,4-trans unit is at least 99%.

A polybutadiene with a high 1,4-trans content can be obtained using soluble vanadium catalysts. $AlEt_3$, $VCl_3 \times 3$ THF and $AlEt_2Cl$—$V(acac)_3$ systems used in benzene or in toluene provide a polymer containing over 99% of 1,4-trans units. Soluble vanadium-based catalysts are used at temperatures lower than 20° C. as their activity deteriorates considerably at higher temperatures. The use of chlorine donors however (for example $CCl_3COOH$) which re-oxidize V(II) to V(III), also allow them to be used at 80° C.

Butadiene-isoprene copolymers with a 1,4 trans structure are described in U.S. Pat. No. 5,844,044. These are used as elastomeric components mixed with other elastomers for the preparation of tyres. They have the disadvantage however of not being completely random, as they have softening temperatures (see Tables 1 and 3 of U.S. Pat. No. 5,844,044). The structure of these copolymers, moreover, is not totally 1,4-trans.

Butadiene-isoprene copolymers with a 1,4-trans structure have now been found, which are completely random and therefore do not have the disadvantages described above.

SUMMARY OF THE INVENTION

In accordance with this, a first object of the present invention relates to random butadiene-isoprene copolymers with a 1,4-trans structure, having a butadiene/isoprene molar composition ranging from 98/2 to 32/68, the above copolymers being crystalline or amorphous depending on the isoprene content.

BRIEF DESCRIPTION OF THE DRAWING

FIGS. 1a through 1d show $^{13}$CNMR spectra of four copolymers according to the present invention.

DETAILED DESCRIPTION OF THE INVENTION

Figure 1C:
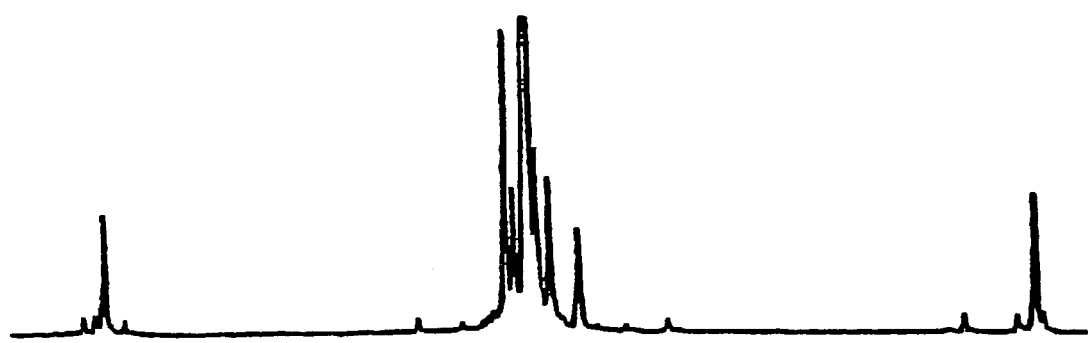

The following products were used in the examples of Tables 1a and 1b: butadiene 2 ml (except in tests 9C and 16C in which it was not used); toluene as solvent (total volume 30 ml); $V(acac)_3$ $5 \times 10^{-6}$ moles; MAO/V=1000 moles/moles.

More specifically, the present invention relates to random amorphous butadiene-isoprene copolymers with a trans-1,4 structure, having a butadiene/isoprene molar composition ranging from 80/20 to 32/68 and a glass transition temperature ranging from −75° C. to −67° C.

The present invention also relates to random crystalline butadiene-isoprene copolymers with a trans-1,4 structure, having a butadiene/isoprene molar composition ranging from 85/15 to 98/2 and a melting point ranging from 100° C. to 50° C.

The term "trans-1,4 structure" means that 1,4-cis and vinyl structures (1,2 of butadiene or 3,4 of isoprene) cannot be detected by the usual analytical techniques, in particular $^{13}$CNMR.

The term "random" means that the two monomers (isoprene and butadiene) are distributed statistically along the polymeric chain. The absence of blocks can be revealed by thermal and $^{13}$CNMR analyses of the copolymers.

A second object of the present invention relates to a process for the preparation of random butadiene-isoprene copolymers with a trans-1,4 structure, by the copolymerization of 1,3 butadiene and isoprene, carried out in the presence of one or more solvents and a catalytic system, characterized in that the above catalytic system comprises:
(a) a first component consisting of a vanadium compound selected from:
(a1) compounds having general formula (Ia) $VO(L)_n(X)_m$ wherein n is an integer from 1 to 3 and m ranges from zero to 2, n+m being equal to 2 or 3;
(a2) compounds having general formula (Ib) $V(L)_p(X)_q$ wherein p is an integer from 1 to 4, q ranges from zero to 3, the sum of p+q being equal to 3 or 4; wherein L is a bidentate ligand and X is a halogen, preferably Chlorine;
b) a second component selected from aluminoxanes and relative derivatives.

The term "bidentate ligand" refers to ligands selected from (i) carboxylic acids and (ii) compounds having the general formula $R^a$—CO—$R^b$, wherein:
$R^a$ is selected from H, a $C_1$–$C_{12}$ alkyl radical, —$OR^C$ wherein $R^c$ is a $C_1$–$C_{12}$ alkyl radical, preferably from —H and —$CH_3$;
$R^b$ is equal to —$CH_2$—CO—(—O—)$_n$—$R^d$ wherein $R^d$ is selected from $C_1$–$C_{12}$ alkyl radicals, n is zero or 1.

The bidentate ligands (ii) therefore comprise compounds having the following formulae wherein "alk" stands for alkyl radical: H—CO—$CH_2$—CO-alk, alk-CO—$CH_2$—CO-alk, alk-O—CO—$CH_2$—CO-alk, H—CO—$CH_2$—CO—O-alk, alk-CO—$CH_2$—CO—O-alk, alk-O—CO—$CH_2$—CO—O-alk.

Typical examples of ligands L are therefore 1,3-diketones (for example 2,4-pentandione, or acetylacetone), β-keto esters (for example ethyl ester of 3-oxo butanoic acid $CH_3$—CO—$CH_2$—CO—$OC_2H_5$), β-ketoaldehydes (for example 3-oxo butanal $CH_3$—CO—$CH_2$—CHO), β-diesters (for example diethylester of propandioic acid $CH_3CH_2O$—CO—$CH_2$—CO—$OCH_2CH_3$), monocarboxylic acids (for example acetic acid).

Typical but non-limiting examples of compounds (a1) are vanadyl acetylacetonate or $VO(acac)_3$, $VOCl(acac)_2$, $VO(acetate)_3$, $VOCl(acetate)_2$, $VO(3\text{-oxo-butanoate})_3$, $VOCl(3\text{-oxo-butanoate})_2$, $VO(3\text{-oxo-butanal})_3$, $VOCl(3\text{-oxo-butanal})_2$.

Typical but non-limiting examples of compounds (a2) are $V(acac)_3$, $VCl(acac)_2$, $V(acetate)_3$, $VCl(acetate)_2$, $V(3\text{-oxo-butanoate})_3$, $VCl(3\text{-oxo-butanoate})_2$, $V(3\text{-oxo-butanal})_3$, $VCl(3\text{-oxo-butanal})_2$.

In the preferred embodiment the vanadium compound is selected from compounds (a2). Even more preferably, the vanadium compound is vanadium acetylacetonate (compound belonging to group a2 wherein L=acetylacetone, p=3, q=0).

As far as aluminoxanes (a2) are concerned, it is known that these are compounds containing Al—O—Al bonds, with a varying O/Al ratio, which can be obtained by the reaction, under controlled conditions, of an aluminum alkyl, or aluminum alkyl halide, with water or other compounds containing pre-established quantities of available water, as, for example, in the case of the reaction of aluminum trimethyl with aluminum hexahydrate sulfate, copper pentahydrate sulfate or iron pentahydrate sulfate.

Aluminoxanes preferably used for the formation of the polymerization catalyst of the present invention are cyclic and/or linear, oligo- or polymeric compounds, characterized by the presence of repetitive units having the following formula:

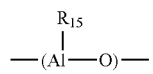

wherein $R_{15}$ is a $C_1$–$C_6$ alkyl group, preferably methyl. Each aluminoxane molecule preferably contains from 4 to 70 repetitive units which may also not all be the same, but contain different $R_{15}$ groups.

The process of the present invention can be carried out using a molar ratio aluminum/vanadium ranging from 10/1 to 10000/1, preferably from 100/1 to 1000/1 and a molar ratio monomers/vanadium ranging from $1\times10^3/1$ to $1\times10^5/1$, preferably from $20\times10^3/1$ to $50\times10^3/1$.

The butadiene-isoprene copolymerization is preferably carried out in a polymerization medium comprising an inert hydrocarbon which is solvent of the monomers and catalytic system. Inert hydrocarbons which can be used in the copolymerization process comprise aliphatic, cycloaliphatic, aromatic hydrocarbons and relative mixtures. More specifically suitable hydrocarbons are those selected from the group of $C_4$–$C_8$ aliphatic hydrocarbons, olefins included, the group of $C_5$–$C_{10}$ cycloaliphatic hydrocarbons, the group of aromatic hydrocarbons (preferably toluene) and relative mixtures.

The copolymerization process of the present invention is carried out at a temperature ranging from −50° C. to +60° C., preferably from −20° C. to +20 ° C.

The copolymerization reaction can be stopped by the addition of one or more terminators suitable for deactivating the catalytic system, followed by the conventional desolventization, washing and drying phases, phases normally used in the production of polydienes. The terminator typically used for deactivating the catalytic system is a protic compound, which includes, but is not limited to, an alcohol, a carboxylic acid, an inorganic acid, water or a combination of these. An antioxidant such as 2,6-di-ter-butyl-1,4-methylphenol can be added, before, after or with the addition of the terminator. The quantity of antioxidant usually ranges from 0.2% to 1% by weight with respect to the polymer.

At the end of the copolymerization, the copolymer can be recovered using the standard techniques, preferably by means of the coagulation technique. Any possible residues of solvent can be removed from the polymer by evaporation, which can be facilitated by high temperatures and the application of a vacuum.

In the experimental examples provided further on, as the tests are carried out batchwise, the conversion is specifically kept low in order to maintain the ratio between the monomers as constant as possible. It is obviously also possible to operate at higher conversions, as required on an industrial scale, when operating in continuous processes, in which the two monomers are fed in continuous.

The process of the present invention can also be carried out in the presence of the activators normally used with catalysts based on vanadium (for example chloro-es-ters).

It should be noted that the process of the present invention requires a much simpler catalytic system than that described in U.S. Pat. No. 5,844,044. In the process of the present invention, in fact, the catalytic system simply consists of the vanadium compound and aluminoxane. On the contrary, the process of U.S. Pat. No. 5,844,044 comprises the use of an extremely complex catalytic system which includes (see example 1 of U.S. Pat. No. 5,844,044) a suspension in hexane of aluminum triisobutyl, vanadium trichloride and titanium tetrachloride.

Finally, it should be pointed out that the catalytic activity of the catalytic system of U.S. Pat. No. 5,844,044 is lower than the catalytic activity of the catalytic system of the present invention. In U.S. Pat. No. 5,844,044, in fact, the polymerization times are in the order of a few hours, whereas in the case of the present invention, they are in the order of minutes, obviously with the same conversion.

The process of the present invention allows copolymers to be obtained having crystalline or amorphous characteristics in relation to the isoprene content in the copolymer. The crystalline products can be used for the modification of plastic materials; the amorphous products can be used in the sector of compound for tyres and in general in the field of rubber compounds.

As far as the molecular weights are concerned, the copolymers obtained according to the process of the present invention have an $M_w$ value ranging from $200\times10^3$ to $500\times10^3$ and an $M_w/M_n$ value ranging from 1.7 to 4, preferably an $M_w$ value ranging from $250\times10^3$ to $400\times10^3$ and an $M_w/M_n$ value ranging from 2.0 to 3.0. These $M_w$ and $M_w/M_n$ values make the copolymers of the present invention particularly suitable for application in the compound sector by means of closed mixers and continuous extruders.

The following examples are provided for a better understanding of the present invention.

EXAMPLES

The following materials were used in the examples provided below:
Vanadium triacetylacetonate [V(acac)$_3$] (Aldrich, purity>97%);
Methylalumoxane (Witco, solution at 10% by weight in toluene);
Toluene (Baker, purity>99% refluxed on Na for about 8 hours, then distilled and preserved on molecular sieves in an environment of dry nitrogen;
Butadiene (Air Liquide, purity>99.5%) evaporated from the container before each test, dried by passing it through a column packed with molecular sieves and finally condensed in the reactor previously cooled to −20° C.;
Isoprene (Aldrich, 99% purity) refluxed on CaH$_2$ for about 2 hours, then distilled and preserved under dry nitrogen.

Copolymerization

The butadiene (2 ml) is condensed in a 50 ml anhydrified glass reactor, maintained at −20° C. Isoprene and toluene are subsequently charged, in this order, into the above reactor. The solution thus prepared is brought to the desired temperature; the MAO and V(acac)$_3$ are then added as toluene solutions. The polymerization is terminated with methanol containing small quantities of hydrochloric acid; the polymer is coagulated, washed repeatedly with methanol and then dried at room temperature under vacuum.

The following products were used in the examples of Table 1: butadiene 2 ml (except in tests 9C and 16C in which it was not used); toluene as solvent (total volume 30 ml); V(acac)$_3$ 5 ×10$^{-6}$ moles; MAO/V=1000 moles/moles.

Again in Tables 1a, and 1b, the B/I feed. ratios represent the butadiene/isoprene molar ratios in the feeding, whereas B/I copol. represents the butadiene/isoprene molar ratio in the final copolymer.

Characterization of the Polymer

The differential scanning calorimetric analyses DSC are effected on a Perkin-Elmer Pyris instrument. The samples, about 10 mg, were heated from −150 °C. to 150° C. in an atmosphere of helium (30 ml/min) with a scanning rate of 20° C./min.

Figure 1D:
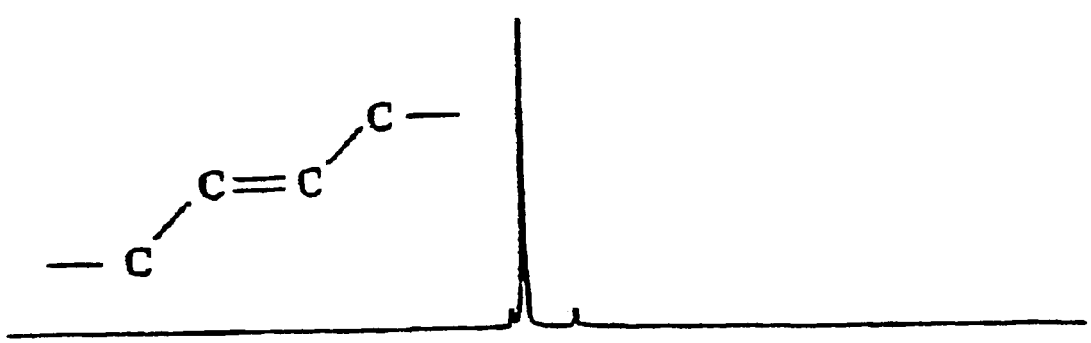

The $^{13}$CNMR analysis is carried out with a Bruker AM 270 instrument. The spectra are obtained in CDCl$_3$ at room temperature using tetramethylsilane (TMS) as internal standard, or in C$_2$D$_2$Cl$_4$ at 103° C. with hexamethyldisiloxane (HMDS) as internal standard. The concentration of the polymer is about 10% by weight. Some $^{13}$CNMR spectra are enclosed (FIGS. 1a, 1b, 1c and 1d) (olefinic zone; CDCl$_3$ as deuterated solvent; TMS as internal standard; a temperature of 25° C.) of:

a) 1,4-trans polybutadiene (Table 1a, Example 1c);
b) butadiene-isoprene copolymer with a B/I composition=86.5/13.5 (Table 1a, Example 4);
c) butadiene-isoprene copolymer with a B/I composition=55.5/44.5 (Table 1a, Example 7);
d) polyisoprene with a mixed 1,4-cis/1,4-trans structure 60/40 (Table 1a, Example 9c).

The position of the peaks (value in ppm) relating to the olefinic carbons of the butadiene and isoprene units, on the basis of what is specified in literature (in particular (i) K. F. Elgert, G. Quack, B. Stutzel, *Polymer* 16, 154 (1975), (ii) F. Conti, A. Segre, P. Pini, L. Porri, *Polymer* 15, 5 (1974), (iii) P. Sozzani, G. Di Silvestro, M. Grassi, M. Farina, *Macromolecules* 17, 2532, 1984) clearly indicates that all the monomeric units present in the butadiene and isoprene copolymers have a 1,4-trans structure.

The composition of the butadiene-isoprene copolymers is evaluated by the $^{13}$CNMR spectra by means of the relation:

$$B\% = \frac{1}{2}A_B / (\frac{1}{2}A_B + A_I)$$

wherein $A_B$ is the integrated resonance area around 130 ppm, due to the CH olefinic carbons of the butadiene units with a 1,4-trans structure; $A_I$ is the integrated resonance area around 124 ppm due to the CH olefinic carbons of the isoprene units with a 1,4-trans structure.

The multiplicity shown by the signals relating to the CH olefinic carbons of the butadiene units (around 130 ppm), the quaternary carbons (around 135 ppm) and the tertiary CH carbons (around 124 ppm) of the isoprene units, indicates a random distribution of the monomeric units inside the polymeric chain and the absence of blocks, according to what is described in literature (see for example P. Sozzani, G. Di Silvestro, M. Grassi, M. Farina *Macromolecules* 17, 2538, 1984).

The molecular weight determination is carried out by means of GPC analysis. All the polymers are dissolved in toluene and then eluted in THF for the determination of the molecular masses. The calculation of the latter was carried out with the universal calibration method, taking into consideration the percentage composition of butadiene and isoprene.

TABLE 1a

| Ex. | B/I feed. | Time (min) | Conv.* % | B/I copol. | m.p. °C. | $T_g$ °C. | $M_w$ ×10$^3$ | $M_w/M_n$ |
|---|---|---|---|---|---|---|---|---|
| 1c | 100/0 | 3 | 25.9 | 100/0 | 109 | | | |
| 2 | 84/16 | 10 | 22.4 | 95.5/4.5 | 57 | | 400 | 3.0 |
| 3 | 72/28 | 10 | 22.1 | 95/5 | 52 | | 410 | 3.1 |
| 4 | 63.5/36.5 | 10 | 18.1 | 86.5/13.5 | 50 | | 360 | 2.4 |
| 5 | 46.5/53.5 | 10 | 11.1 | 82.5/17.5 | −5 | −72 | 352 | 2.5 |
| 6 | 34/66 | 10 | 7.5 | 68.5/31.5 | −21 | −75 | 305 | 2.2 |
| 7 | 24.5/75.5 | 10 | 7.7 | 55.5/44.5 | | −72 | 290 | 2.2 |
| 8 | 13.5/86.5 | 10 | 7 | 46/54 | | −70 | 270 | 2.1 |
| 8b | 10.5/89.5 | 10 | 5 | 37/63 | | −69 | 330 | 2.1 |
| 9c | 0/100 | 1640 | 4.3 | 0/100 | | | | |

*The conversions were kept low (using short polymerization times, i.e. 10 minutes) in order to keep the molar ratio of the monomers as constant as possible (equal to that of the charge).

Polymerization Conditions of the Tests of Table 1a:
butadiene, 2 ml (in test 9c butadiene is not present); toluene as solvent (total volume, 30 ml); V, 5×10$^{-6}$ moles; MAO/V =1000; temperature: +20° C.

Note: In all the copolymers indicated in Table1a, the isoprene and butadiene units have a 1,4-trans structure. Only the polyisoprene has a mixed cis-1,4/trans-1,4 structure, 60/40.

TABLE 1b

| Ex. | B/I feed. | Time (min) | Conv.* % | B/I copol. | m.p. °C. | $T_g$ °C. | $M_w$ ×10$^3$ | $M_w/M_n$ |
|---|---|---|---|---|---|---|---|---|
| 10c | 100/0 | 3 | 16.6 | 100/0 | 117 | | | |
| 11 | 93/7 | 3 | 12.4 | 98/2 | 101 | | 500 | 3.0 |
| 12 | 87/13 | 3 | 12.0 | 96/4 | 75 | | 495 | 3.0 |
| 13 | 72/28 | 3 | 9.6 | 89.5/10.5 | 51 | | 480 | 2.9 |
| 14 | 56.5/43.5 | 3 | 7.4 | 80.5/19.5 | 9 | −73 | 355 | 2.5 |
| 15 | 39.5/60.5 | 4 | 10.3 | 75.5/24.5 | −21 | −70 | 382 | 2.2 |
| 16 | 24.5/75.5 | 4 | 6.1 | 50.5/49.5 | | −72 | 340 | 2.3 |
| 17 | 16.5/83.5 | 4 | 3.8 | 46.5/53.5 | | −71 | 350 | 2.0 |
| 17a | 10/90 | 4 | 2.5 | 35.5/64.5 | | −69 | 330 | 2.1 |
| 17b | 8.5/91.5 | 4 | 2.0 | 32/68 | | −67 | 340 | 2.2 |
| 18c | 0/100 | 44 | 40.9 | 0/100 | 46 | | | |

*The conversions were kept low (using short polymerization times, i.e. 3–4 minutes) in order to keep the molar ratio of the monomers as constant as possible (equal to that of the charge).

Polymerization Conditions of the Tests of Table 1b:
butadiene, 2 ml (in test 18c butadiene is not present); toluene as solvent (total volume, 30ml); V, $5\times10^{-6}$ moles; MAO/V=1000; temperature: $-30°$ C.

Note: In all the copolymers indicated in Table 1b, the isoprene and butadiene units have a 1,4-trans structure.

Comments on Tables 1a and 1b.

At a temperature of $+20°$ C., the catalytic system $V(acac)_3$-MAO produces crystalline 1,4-trans polybutadiene (Table 1a, Example 1c) and amorphous polyisoprene with a mixed 1,4-cis and 1,4-trans structure (about 60:40 molar fraction, Table 1a, Example 9c).

At a temperature of $-30°$ C., both monomers produce crystalline polymers having a 1,4-trans structure (Table 1b Examples 10c and 18c).

The isoprene units always have a 1,4-trans structure in the copolymers, regardless of the polymerization temperature. This result is particularly surprising for the tests effected at $+20°$ C., as the homopolymerization of isoprene at room temperature gives a polymer with a mixed cis/trans structure (Table 1a, Example 9c).

When the butadiene content in the copolymers is $\geq 85\%$, crystalline 1,4-trans copolymers are obtained, whose melting point decreases with an increase in the isoprene content.

When the butadiene content in the copolymer is less than 85%, amorphous copolymers are obtained, having a $T_g$ ranging from $-67°$ C. to $-75°$ C.

On the basis of the feeding composition and composition of the copolymers determined by means of $^{13}$CNMR analysis, and applying the Fineman-Ross equation, the following reactivity coefficient values are obtained (subscript 1 refers to butadiene, subscript 2 to isoprene):

$+20°$ C. $r_1=3.6$; $r_2=0.17$; $r_1 \times r_2=0.61$;

$-30°$ C. $r_1=3.0$; $r_2=0.16$; $r_1 \times r_2=0.48$.

The above values are in accordance with a random distribution of the comonomers inside the polymeric chain.

The invention claimed is:

1. Random butadiene-isoprene copolymers with a 1,4-trans structure, having a butadiene/isoprene molar composition ranging from 98/2 to 32/68, the above copolymers being crystalline or amorphous depending on the isoprene content, 1,4-cis and vinyl structure not being detected by $^{13}$CNMR techniques.

2. The copolymers according to claim 1, having a butadiene/isoprene molar composition ranging from 80/20 to 32/68, which are amorphous and have a glass transition temperature ranging from $-75°$ C. to $-67°$ C.

3. The copolymers according to claim 1, having a butadiene/isoprene molar composition ranging from 85/15 to 98/2, which are crystalline and have a melting point ranging from $100°$ C. to $50°$ C.

4. The copolymers according to claim 1, which have an $M_w$ value ranging from $200\times10^3$ to $500\times10^3$ and an $M_w/M_n$ value ranging from 1.7 to 4.

5. The copolymers according to claim 4, which have an $M_w$ value ranging from $250\times10^3$ to $400\times20\ 10^3$ and an $M_w/M_n$ value ranging from 2.0 to 3.0.

6. A process for the preparation of random butadiene-isoprene copolymers with a 1,4-trans structure, comprising copolymerization of 1,3-butadiene and isoprene, in the presence of one or more solvents and a catalytic system, wherein the catalytic system comprises:
   (a) a first component consisting of a vanadium compound selected from the group consisting of:
   (a1) compounds having general formula (Ia) $VO(L)_n(X)_m$ wherein n is an integer from 1 to 3 and m ranges from zero to 2, n+m being equal to 2 or 3; and
   (a2) compounds having general formula (Ib) $V(L)_p(X)_q$ wherein p is an integer from 1 to 4, q ranges from zero to 3, the sum of p+q being equal to 3 or 4;
   wherein L is a bidentate ligand and X is a halogen; and
   (b) a second component selected from the group consisting of aluminoxanes.

7. The process according to claim 6, wherein the vanadium compound is selected from the (a2) group of compounds.

8. The process according to claim 7, wherein the vanadium compound is vanadium acetylacetonate.

9. The process according to claim 6, wherein the molar ratio aluminum/vanadium ranges from 10/1 to 10000/1.

10. The process according to claim 9, wherein the molar ratio aluminum/vanadium ranges from 100/1 to 1000/1.

11. The process according to claim 6, wherein the molar ratio monomers/vanadium ranges from $1\times10^3/1$ to $1\times10^5/1$.

12. The process according to claim 11, wherein the molar ratio monomers/vanadium ranges from $20\times10^3/1$ to $50\times10^3/1$.

13. The process according to claim 6, wherein the solvent is selected from the group consisting of aliphatic hydrocarbons, cycloaliphatic hydrocarbons, aromatic hydrocarbons and mixtures thereof.

14. The process according to claim 13, wherein the solvent is selected from the group consisting of $C_4$–$C_8$ aliphatic hydrocarbons, $C_5$–$C_{10}$ cycloaliphatic hydrocarbons, aromatic hydrocarbons and mixtures thereof.

15. The process according to claim 6, which is carried out at a temperature ranging from $-50°$ C. to $+60°$ C.

16. The process according to claim 15, which is carried out at a temperature ranging from $-20°$ C. to $+20°$ C.

17. The process according to claim 6, wherein X is chlorine.

18. The process according to claim 14, wherein the solvent is toluene.

* * * * *